(12) United States Patent
Yamamoto et al.

(10) Patent No.: US 7,882,096 B2
(45) Date of Patent: Feb. 1, 2011

(54) INFORMATION MANAGING APPARATUS, INFORMATION MANAGING METHOD, AND COMPUTER PRODUCT

(75) Inventors: Kenichi Yamamoto, Yokohama (JP); Hiromi Tanai, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/644,572

(22) Filed: Dec. 22, 2006

(65) Prior Publication Data
US 2008/0059430 A1    Mar. 6, 2008

(30) Foreign Application Priority Data
Aug. 30, 2006    (JP) .............................. 2006-234449

(51) Int. Cl.
*G06F 17/30*    (2006.01)

(52) U.S. Cl. ........................................ 707/706; 707/822

(58) Field of Classification Search ................. 707/706, 707/822
See application file for complete search history.

(56) References Cited

U.S. PATENT DOCUMENTS

| | | | |
|---|---|---|---|
| 6,035,297 A * | 3/2000 | Van Huben et al. ......... 707/695 |
| 6,671,681 B1 * | 12/2003 | Emens et al. ............... 707/706 |
| 6,694,331 B2 * | 2/2004 | Lee ............................. 707/706 |
| 6,697,821 B2 * | 2/2004 | Ziff et al. .................... 707/706 |
| 6,732,092 B2 * | 5/2004 | Lucas et al. ................. 707/706 |
| 7,003,528 B2 * | 2/2006 | Dan et al. .................... 709/217 |
| 7,039,630 B2 * | 5/2006 | Shimazu ..................... 707/706 |
| 7,051,038 B1 * | 5/2006 | Yeh et al. .................... 707/603 |
| 7,530,112 B2 * | 5/2009 | Smith ........................... 726/28 |
| 2002/0169771 A1 * | 11/2002 | Melmon et al. ................ 707/5 |
| 2007/0005967 A1 * | 1/2007 | Mister et al. ................ 713/168 |
| 2007/0226146 A1 * | 9/2007 | Ruul ............................. 705/51 |
| 2008/0181414 A1 * | 7/2008 | Deaver et al. ............... 380/279 |

FOREIGN PATENT DOCUMENTS

JP    2003-141381    5/2003

* cited by examiner

*Primary Examiner*—Don Wong
*Assistant Examiner*—Kim T Nguyen
(74) *Attorney, Agent, or Firm*—Fujitsu Patent Center

(57) ABSTRACT

A storing unit stores therein hierarchical-relation information indicating information on a user having a hierarchical relation. A determining unit determines, when information on an article is acquired from a user who created the information on the article, a user to which the information on the article is to be output, based on the hierarchical-relation information. An output unit outputs the information on the article to a user based on a result of determination by the determining unit.

8 Claims, 19 Drawing Sheets

FIG.2

ACCOUNT INFORMATION

| USER ID | PASSWORD |
|---|---|
| A | ○○○○ |
| B | ○○○○ |
| C | ○○○○ |
| D | ○○○○ |
| E | ○○○○ |
| F | ○○○○ |
| G | ○○○○ |
| H | ○○○○ |
| I | ○○○○ |
| J | ○○○○ |
| K | ○○○○ |
| ⋮ | ⋮ |

FIG.5

ARTICLE-MANAGEMENT INFORMATION

| ARTICLE-IDENTIFICATION INFORMATION | ARTICLE CREATOR ID | PUBLICATION RANGE | CONTENT OF ARTICLE | KEYWORD FLAG |
|---|---|---|---|---|
| C1 | C | CDHI | ARTICLE DATA CORRESPONDING TO ARTICLE-IDENTIFICATION INFORMATION C1 (ALL PERSONS CONCERNED WILL BE NOTIFIED OF SETTLEMENT REPORT OF 2005.) | ON |
| C2 | E | EJ | ARTICLE DATA CORRESPONDING TO ARTICLE-IDENTIFICATION INFORMATION C2 (PRICE ADJUSTMENT OF PURCHASED PRODUCTS ON LIST FOR CURRENT TERM WILL BE MADE AT THE FOLLOWING LOCATION.) | ON |
| C3 | J | ABCDEFGHIJK | ARTICLE DATA CORRESPONDING TO ARTICLE-IDENTIFICATION INFORMATION C3 (HAPPY NEW YEAR. BE COUNTING ON YOU THIS YEAR.) | OFF |
| C4 | K | JD | ARTICLE DATA CORRESPONDING TO ARTICLE-IDENTIFICATION INFORMATION C4 (ALL OF YOU ARE SUPPOSED TO PARTICIPATE IN MEETING TOMORROW.) | OFF |
| ... | ... | ... | ... | ... |

FIG.13
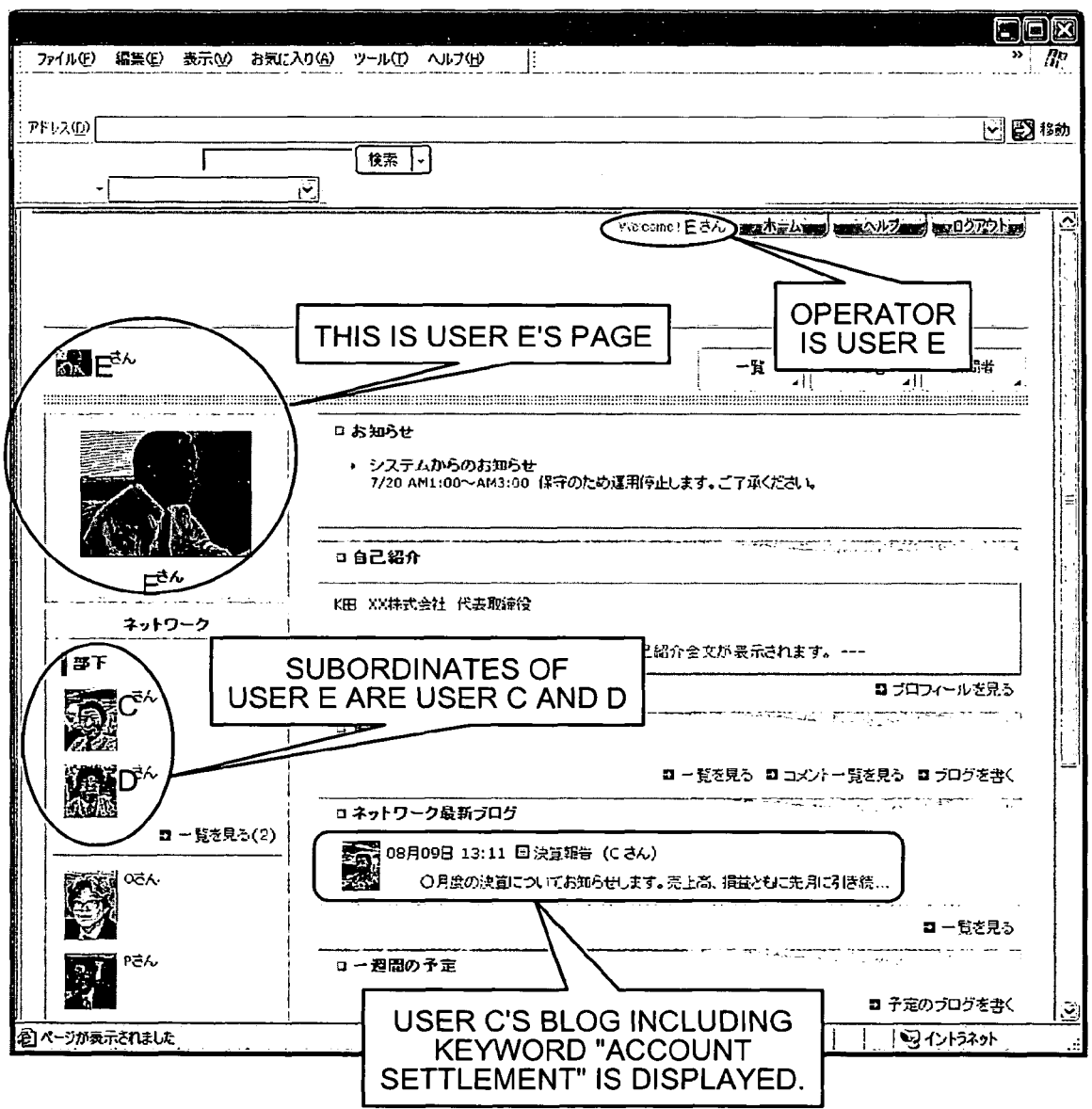
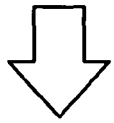

INFORMATION MANAGING APPARATUS, INFORMATION MANAGING METHOD, AND COMPUTER PRODUCT

BACKGROUND OF THE INVENTION

1. Field of the Invention

The present invention generally relates to a technology for managing of information on an article shared among users on a network.

2. Description of the Related Art

In recent years, a network environment is put into place in every company, so that individual members of a company can exchange opinions with one another via the network. For example, a company member (hereinafter, "member") creates an article (e.g., an article about messages related to company activities, topical news, technical topics, or topics of conversation among friends) using a blog or the like, and makes information on the created article public to the other members. The publication range of the article created by the member depends on situations. Namely, the publication range often spreads over entire members or is limited only to colleagues of the member. The member who created the article sets the publication range of the article in view of the content of the article, the company regulations, and the like.

By so setting, only the limited members are accessible to the article, leakage of personal information on the member is prevented, and leakage of secret information associated with the article to the malicious third party is prevented.

A personal-connection information search system (hereinafter, "search system") is disclosed in, for example, Japanese Patent Application Laid-Open No. 2003-141381. According to the Japanese Patent Application Laid-Open No. 2003-141381, information on personal connections of a plurality of users and information on the respective users are registered in a database in advance. If the search system receives search-target information from a terminal of one of the users, then the search system refers to the information registered in the database and outputs personal-connection information corresponding to the received search-target information to the users concerned. It is thereby possible to mediate between the personal connections among the respective users.

The conventional technique as disclosed in the Japanese Patent Application Laid-Open No. 2003-141381 has, however, the following disadvantages. The members who are eligible to view the article created by a certain member are inefficiently notified of the article. As a result, information included in the article cannot be used effectively.

Moreover, it is difficult to define the setting of the publication range of the article. Due to this, the publication range inadvertently fails to include a member who should be within the publication range. Conversely, the publication range inadvertently includes a member who should not be within the publication range. As a result, the information on the article is not made public to those who need the information on the article (or those who should view the article). Moreover, leakage of secret information on the article may possibly occur.

SUMMARY OF THE INVENTION

It is an object of the present invention to at least partially solve the problems in the conventional technology.

A computer-readable recording medium according to one aspect of the present invention stores therein a computer program for managing information an article shared among a plurality of users on a network. The computer program causes a computer to execute storing hierarchical-relation information indicating information on a user having a hierarchical relation: determining, when the information on the article is acquired from a user who created the information on the article, a user to which the information on the article is to be output, based on the hierarchical-relation information; and outputting the information on the article to a user based on a result of determination at the determining.

An apparatus according another aspect of the present invention is for managing information an article shared among a plurality of users on a network. The apparatus includes a storing unit that stores therein hierarchical-relation information indicating information on a user having a hierarchical relation: a determining unit that determines, when the information on the article is acquired from a user who created the information oh the article, a user to which the information on the article is to be output, based on the hierarchical-relation information; and an output unit that outputs the information on the article to a user based on a result of determination by the determining unit.

A method according to still another aspect of the present invention is for managing information an article shared among a plurality of users on a network. The method includes storing hierarchical-relation information indicating information on a user having a hierarchical relation: determining, when the information on the article is acquired from a user who created the information on the article, a user to which the information on the article is to be output, based on the hierarchical-relation information; and outputting the information on the article to a user based on a result of determination at the determining.

The above and other objects, features, advantages and technical and industrial significance of this invention will be better understood by reading the following detailed description of presently preferred embodiments of the invention, when considered in connection with the accompanying drawings

BRIEF DESCRIPTION OF THE DRAWINGS

FIG. 2 is a table for explaining an example of a data structure of account information;

FIG. 5 is a table for explaining an example of a data structure of article-management information;

FIGS. 12 to 18 are schematics of examples of a screen displayed on a client.

DETAILED DESCRIPTION OF THE PREFERRED EMBODIMENTS

Exemplary embodiments of the present invention will be explained in detail below with reference to the accompanying drawings. According to the present embodiments, an information managing apparatus will be employed for explaining as an embodiment of an information managing program; however, the present invention is not limited to the above scheme.

Information on users who have the hierarchical relation (e.g., the superior-and-subordinate relation in a company) (hereinafter, "hierarchical-relation information") is stored in the information managing apparatus. If acquiring information on an article (hereinafter, "article information") created by one of the users (hereinafter, "article creator"), the information managing apparatus determines to the terminal (hereinafter, also "client") of which user the article information is to be output based on the hierarchical-relation information. Furthermore, the information managing apparatus outputs (i.e., "announces") the article information to the client of the eligible user based on the determination result. Specifically, the information managing apparatus outputs the article information to the client of each of or both of the superior and subordinate of the article creator.

It is thereby advantageously possible to appropriately set the publication range of the article information and make effective use of the article information.

Figure 1:
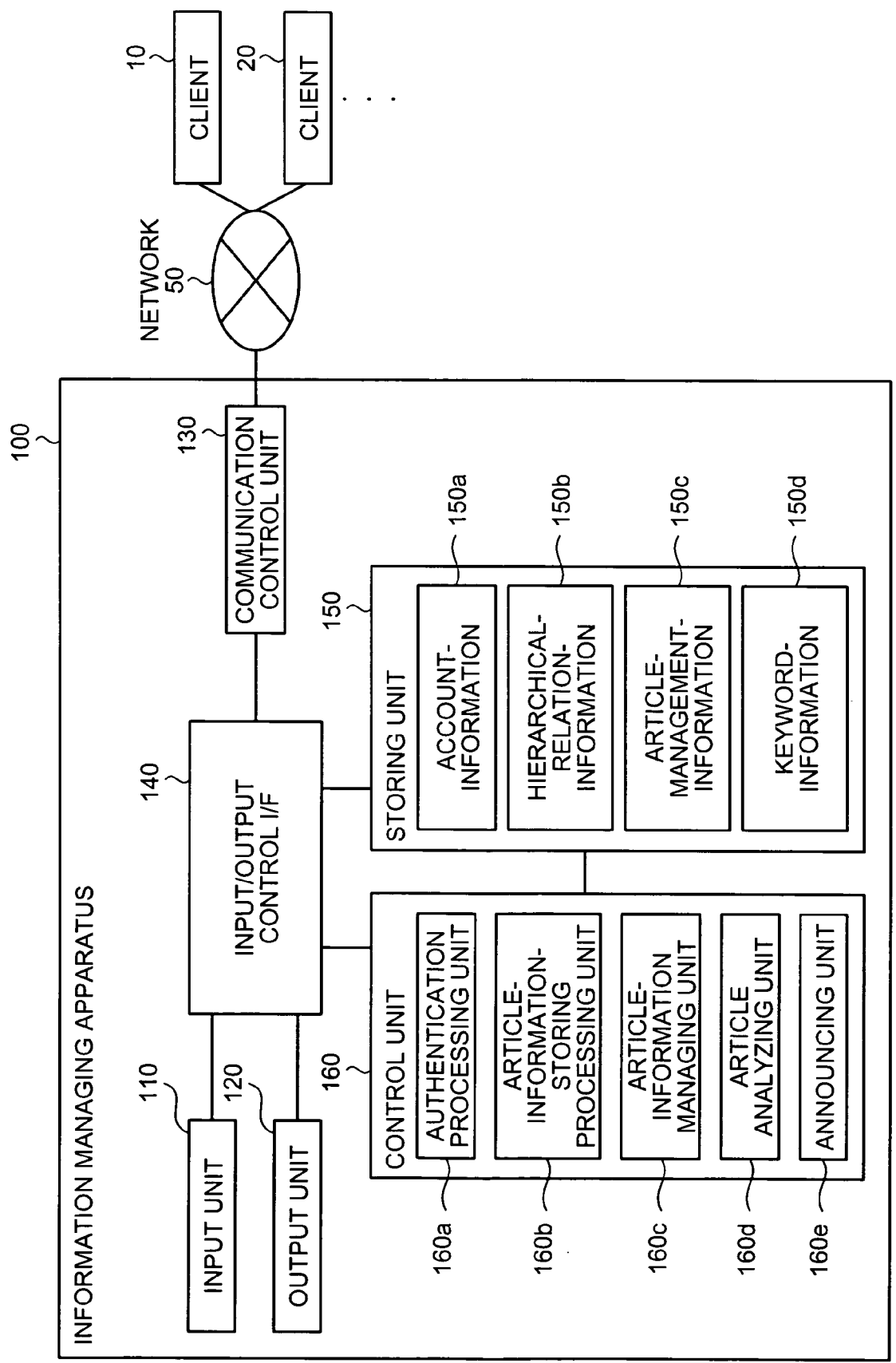
FIG. 1 is a functional block diagram of an information managing apparatus according to an embodiment of the present invention.

FIG. 1 is a block diagram of an information managing apparatus 100 according to the present embodiment of the present invention. As shown in FIG. 1, the information managing apparatus 100 is connected to clients 10 and 20 via a network 50. The information managing apparatus 100 includes an input unit 110, an output unit 120, a communication control unit 130, an input/output control interface (I/F) 140, a storing unit 150, and a control unit 160. Although the clients 10 and 20 are shown for the convenience of explanation, the information managing apparatus 100 can be connected to not only the clients 10 and 20 but also the other clients and can hold data communication with each of the clients.

The input unit 110 is input means from which various pieces of information are input to the information managing apparatus 100. The input unit 110 is configured to include, for example, a keyboard, a mouse, a microphone, and a medium reader that reads data from a recording medium (e.g., a flexible disk (FD), a CD-ROM, a DVD disk, a magnetooptical disk or an IC card). A combination of a monitor included in the output unit 120 and the mouse included in the input unit 110 functions as a pointing device.

The output unit 120 is output means from which various pieces of information are output, and is configured to include, for example, the monitor (which can be a display or a touch panel) and a loudspeaker. The communication control unit 130 is means for mainly controlling a communication between the information managing apparatus 100 and each of the clients 10 and 20. The input/output control I/F 140 is means for controlling the input unit 110, the output unit 120, the communication control unit 130, the storing unit 150, and the control unit 160 to input/output data.

The storing unit 150 is means for storing data and programs necessary for various processings performed by the control unit 160. Specifically, the storing unit 150 includes, particularly as units of close relevance to the present embodiment, account information 150a, hierarchical-relation information 150b, article-management information 150c, and keyword information 150d.

Figure 2:
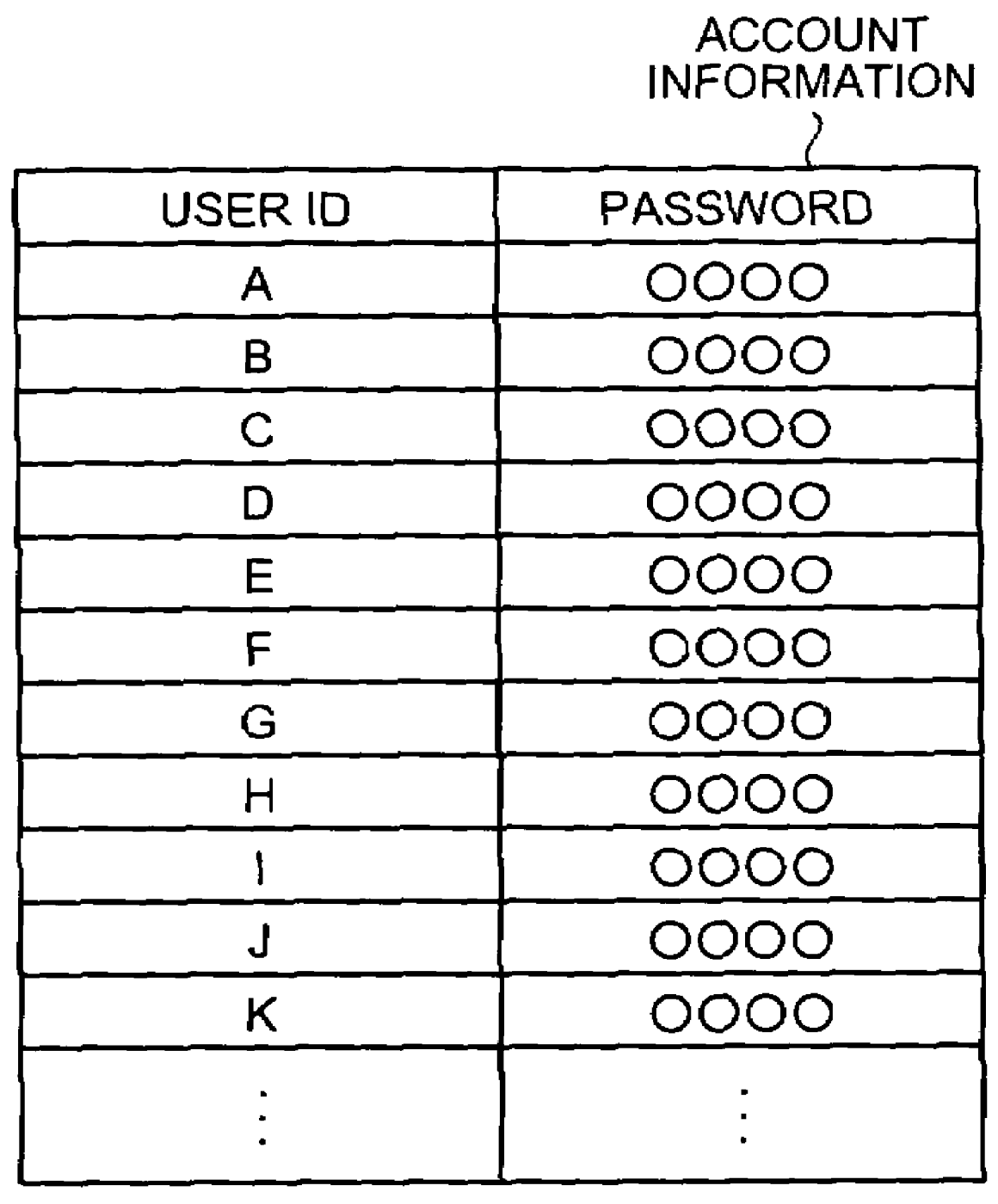

The account information 150a is data for managing the account of each user. FIG. 2 is a table for explaining an example of the data structure of the account information. As shown in FIG. 2 the account information includes user identification (ID) for identifying each user and a password corresponding to the user ID.

Figure 3:
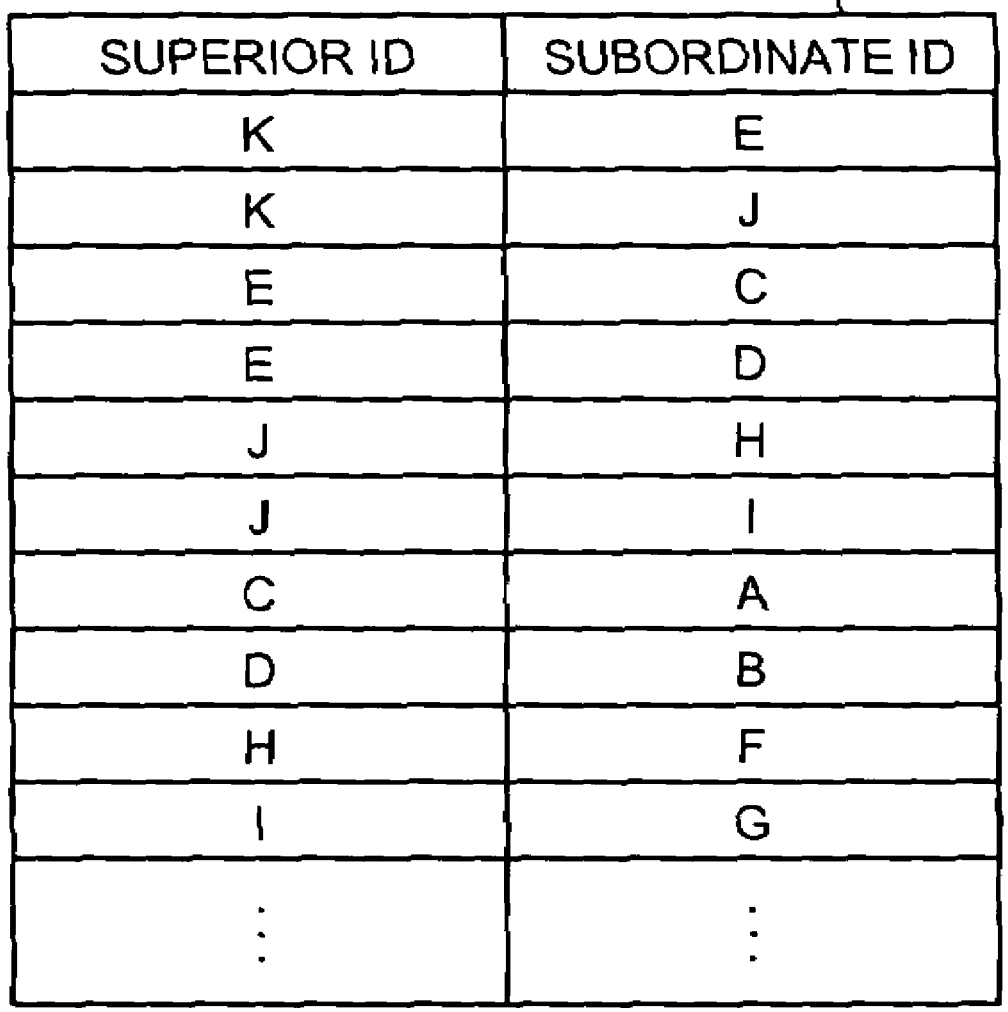
FIG. 3 is a table for explaining an example of a data structure of hierarchical-relation information.
Figure 4:
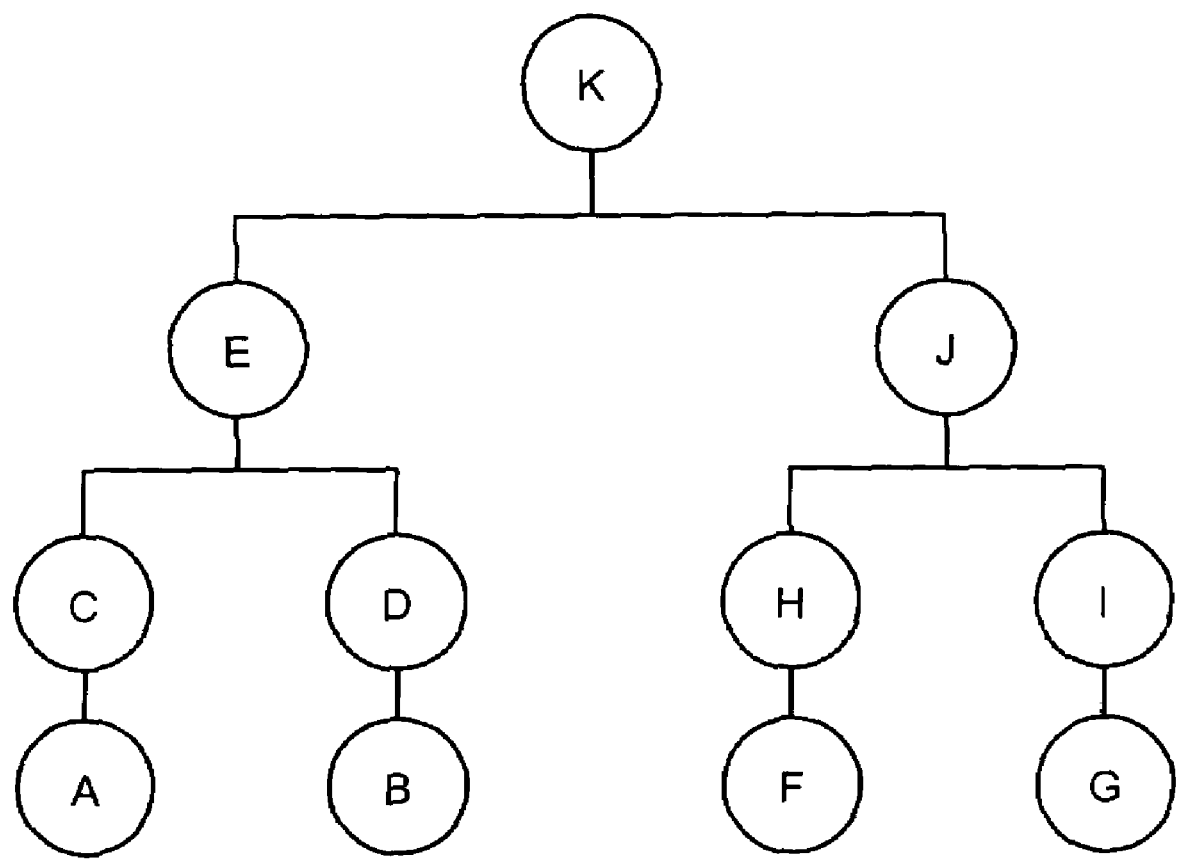
FIG. 4 is a tree diagram of the hierarchical-relation information shown in FIG. 3.

The hierarchical-relation information 150b is recorded data of information on users who have the superior-subordinate relation in a company. FIG. 3 is a table for explaining an example of the data structure of the hierarchical-relation information. FIG. 4 is a tree diagram of the hierarchical-relation information shown in FIG. 3. As shown in FIGS. 3 and 4, subordinates of a user identified by a user ID "E" (hereinafter, user "E"; the same shall apply hereafter) are users "A to D". Subordinates of a user "J" are users "F to I". Subordinates of a user "K" are users "E and J".

The article-management information 150c is recorded data of the correspondence among the article information, information on the article creator of the article information, and information on the publication range of the article information. FIG. 5 is a table for explaining an example of the data structure of the article-management information. As shown in FIG. 5, the article-management information includes article-identification information on each piece of article information, the user ID of the article creator who creates the article information, the publication range of the article information, the content of the article information, and a keyword flag. The article-identification information is used for identifying each piece of article information. The user ID is used for identifying the article creator. The keyword flag indicates whether a keyword is present in the article information.

As shown in FIG. 5, article information identified by article-identification information "C1" (hereinafter, article information "C1"; the same shall apply hereafter) is created by a user "C". The publication range of the article information "C1" is "C, D, H, and I". Namely, users accessible to the article information "C1" are users "C, D, H, and I". The keyword flag is turned on for the article information "C1", which indicates that a keyword is present in the content of the article information "C1". Article information "C2" is created by the user "E". Users accessible to the article information "C2" are users. "E and J". The keyword flag is turned on for the article information "C2", which indicates that a keyword is present in the content of the article information "C2".

Likewise, article information "C3" is created by the user "J". Users accessible to the article information "C3" are users "A to K". The keyword flag is turned off for the article information "C3", which indicates that no keyword is present in the content of the article information "C3". Article information "C4" is created by the user "K". Users accessible to the article information "C4" are users "J and D". The keyword flag is turned off for the article information "C4", which indicates that no keyword is present in the content of the article information "C4".

Figure 6:
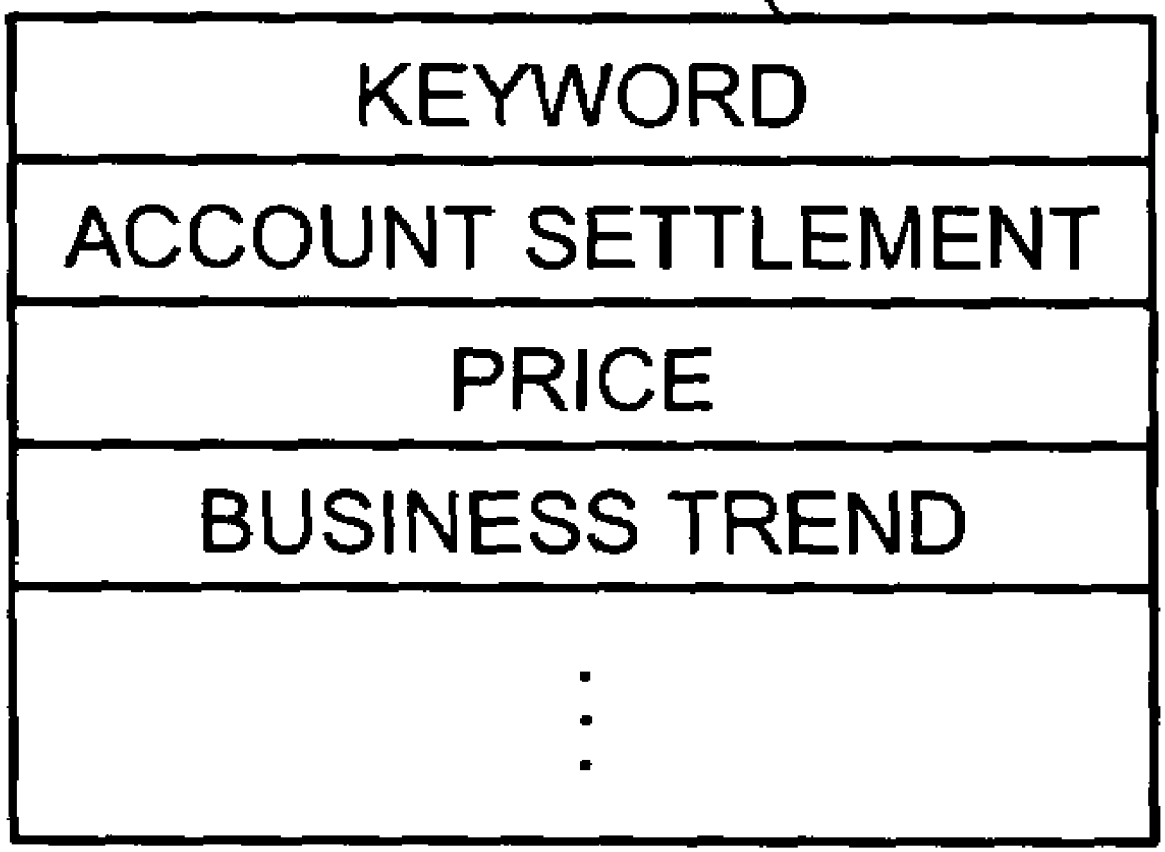
FIG. 6 is a table for explaining an example of keyword information.

The keyword information 150d is recorded data of predetermined keywords ("keywords"). If at least one of the keywords stored in the keyword information 150d is present in the article information, the article information is output under predetermined conditions. FIG. 6 is a table for explaining an example of the keyword information. As shown in FIG. 6, "account settlement", "price", and "business trend" are stored, as keywords, in the keyword information 150d.

The control unit 160 includes an internal memory that stores therein programs and control data for specifying various processing procedures. The control unit 160 is control means for performing processings according to the respective programs or data. As shown in FIG. 1, the control unit 160 includes, particularly as units of close relevance to the present embodiment, an authentication processing unit 160*a*, an article-information-storing processing unit 160*b*, an article-information managing unit 160*c*, an article analyzing unit 160*d*, and an announcing unit 160*e*.

The authentication processing unit 160*a* is a processing unit that determines whether to authorize the client 10 (for the sake of convenience) to log in to the information managing apparatus 100 when the information managing apparatus 100 receives a login request from the client 10. Specifically, when the information managing apparatus 100 receives the login request, the authentication processing unit 160*a* compares the user ID and the password output from the client 10 with the account information. Namely, the authentication processing unit 160*a* determines whether the user of the client 10 indicated by the user ID and the password is eligible to log into the information managing apparatus 100. If determining that the user of the client 10 indicated by the user ID and the password is eligible, the authentication processing unit 160*a* authorizes the client 10 to log in to the information managing apparatus 100.

The article-information-storing processing unit 160*b* is a processing unit that acquires various information on the article information output from the client 10 authorized to log in to the information managing apparatus 100. The article-information-storing processing unit 160*b* records the acquired article information as the article-management information 150*c*.

Specifically, the article-information-storing processing unit 160*b* acquires the article information, the user ID of the article creator, and the publication range of the article information from the client 10. Furthermore, the article-information-storing processing unit 160*b* associates the acquired article information, user ID of the article creator, and publication range of the article information, and records them as the article-management information 150*c*.

The article-information managing unit 160*c* is a processing unit that determines whether to authorize the client of a user (hereinafter, "access requester") who transmits an access request based on the hierarchical-relation information and the publication range included in the article-management information. Specifically, when the information managing apparatus 100 receives the access request to access the article information from the access requester, i.e., the client 10 authorized to log in, the article-information managing unit 160*c* determines whether to authorize the client 10 to access the article information. Processings performed by the article-information managing unit 160*c* will be explained specifically. The processings include a processing performed when the "keyword flag" is turned on for the access-target article information and a processing performed when the "keyword flag" is turned off for the access-target article information. It is to be noted that, if the keyword flag is turned on, it is indicated that a keyword is present in the access-target article information. If the keyword flag is turned off, it is indicated that no keyword is present in the access-target article information.

The processing performed when the "keyword flag" is turned off for the access-target article information will first be explained. In this case, when the information managing apparatus 100 receives the access request to access the access-target article information, the article-information managing unit 160*c* acquires the user ID of the access requester. Furthermore, the article-information managing unit 160*c* compares the acquired user ID with the publication range included in the article-management information. Namely, the article-information managing unit 160*c* determines whether the user ID of the access requestor is within the publication range. If the user ID of the access requester is within the publication range, the article-information managing unit 160*c* authorizes the client 10 of the access requester to access the access-target article information. If the user ID of the access requester is not within the publication range, the article-information managing unit 160*c* does not authorize the client 10 of the access requester to access the access-target article information.

The processing performed when the "keyword flag" is turned on for the access-target article information will next be explained. In this case, when the information managing apparatus 100 receives the access request to access the access-target article information, the article-information managing unit 160*c* acquires the user ID of the access requester. Furthermore, the article-information managing unit 160*c* compares the acquired user ID with the hierarchical-relation information and the article-management information. Namely, the article-information managing unit 160*c* determines whether the access requester is the immediate superior or subordinate of the article creator of the access-target article information. If the access requester is the immediate superior or subordinate of the article creator, the article-information managing unit 160*c* authorizes the client 10 of the access requestor to access the access-target article information. If the access requester is not the immediate superior or subordinate of the article creator, the article-information managing unit 160*c* performs the same processing as "the processing performed when the "keyword flag" is turned off for the access-target article information.

Figure 7:
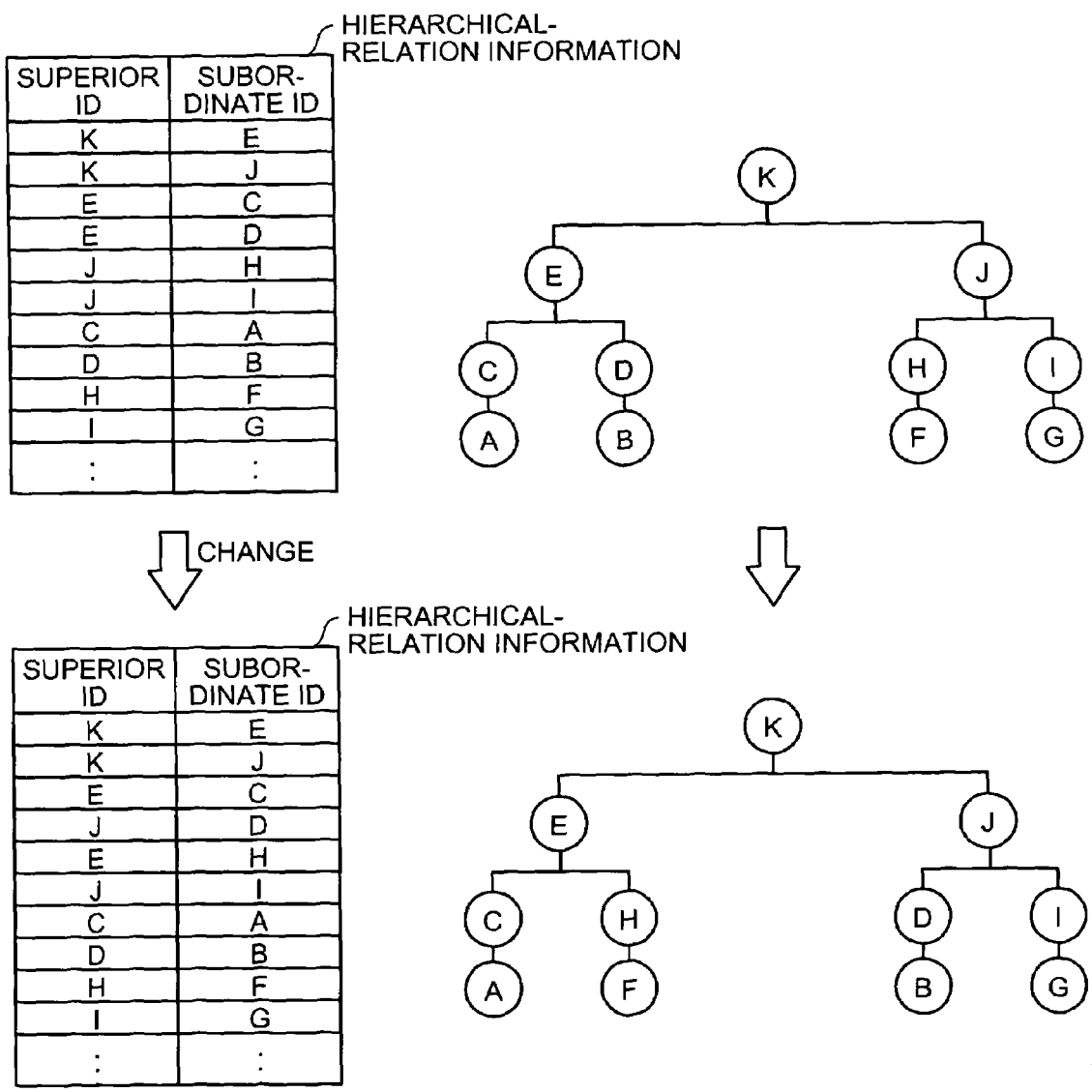
FIG. 7 is a schematic for explaining a change in the hierarchical-relation information between before and after an update.

If the article-information managing unit 160*c* acquires new hierarchical-relation information from the client 10 authorized to log in to the information managing apparatus 100 or from the input unit 110, the article-information managing unit 160*c* updates the hierarchical-relation information based on the acquired hierarchical-relation information. FIG. 7 is a schematic for explaining a change in the hierarchical-relation information between before and after update of the hierarchical-relation information. As shown in FIG. 7, subordinates "H and F" of the user "J" are changed to subordinates of the user "E". Subordinates "D and B" of the user "E" are changed to subordinates of the user "J". In this manner, the publication range of the article information, for which the keyword flag is turned on, is changed according to the change in the superior-subordinate relation, i.e., hierarchical-relation information.

The article analyzing unit 160*d* is a processing unit that compares the access-target article information with the keyword information when the information managing apparatus 100 acquires the access-target article information from the client 10 authorized to log in to the information managing apparatus 100. Namely, the article analyzing unit 160*d* determines whether a keyword is present in the access-target article information. If a keyword is present in the access-target article information, the article analyzing unit 160*d* turns on the keyword flag included in the article-management information for the access-target article information. If no keyword is present in the access-target article information, the article analyzing unit 160*d* turns off the keyword flag.

Referring to FIG. 5, the keyword "account settlement" is present in the article information C1. Therefore, the article analyzing unit 160*d* turns on the keyword flag for the article information C1. The keyword "price" is present in the article information C2. Therefore, the article analyzing unit 160*d* turns on the keyword flag for the article-identification information C2. No keywords are present in the contents of the article information C3 and C4. Therefore, the article analyzing unit 160d turns off the keyword flags for the article information C3 and C4, respectively.

The processings performed by the article-information managing unit 160c will be considered again. If the keyword flag is turned on for the access-target article information, the immediate superior and immediate subordinate of the article creator can view the article information. Therefore, the publication range of the article information is substantially enlarged. Specifically, referring to the article-management information shown in FIGS. 4 and 5, the publication range of the article information C1 is "C, D, H, and I". However, because the keyword flag is turned on for the article information C1, the immediate superior "E" and the immediate subordinate "A" of the article creator "C" are accessible to the article information. Therefore, the publication range of the article information C1 is substantially enlarged to "C, D, H, I, E, and A".

Likewise, the publication range of the article information C2 is "E and J". However, because the keyword flag is turned on for the article information C2, the immediate superior "K" and the immediate subordinates "C and D" of the article creator "E" are accessible to the article information C2. Therefore, the publication range of the article information C2 is substantially enlarged to "E, J, K, C, and D". As for the article-identification information C3 and C4, the keyword flags are turned off, respectively. Due to this, the publication ranges of the article information C3 and C4 remain "A to K" and "J and D", respectively.

The announcing unit 160e is a processing unit that determines to the client of which user the article information is to be output if the article information is acquired from the client 10 authorized to log in to the information managing apparatus 100. The processing performed by the announcing unit 160e will be explained. First, the announcing unit 160e acquires the user ID of the article creator, and compares the acquired user ID with the hierarchical-relation information. The announcing unit 160e makes a list of user IDs of the immediate superior and subordinates including indirect subordinates of the article creator, thereby generating announcement-target candidate information. If the user ID of the article creator is, for example, "C", the user IDs listed in the announcement-target candidate information are "E and A".

The announcing unit 160e compares the announcement-target candidate information with the "substantial" publication range of the article information. The "substantial" publication range means the publication range that is enlarged to include the immediate superior and the immediate subordinate of the article creator if the keyword flag is turned on for the article information. The announcing unit 160e determines which IDs are common to the announcement-target candidate information and the substantial publication range. Furthermore, the announcing unit 160e outputs the article information to the clients of the users identified by the user IDs determined to be common. If the article creator is, for example, "J", the announcement-target candidate information includes the user IDs of the immediate superior "K" and the subordinates including indirect subordinates "H, I, F, and G" (see FIG. 4).

The processing performed by the announcing unit 160e will be explained more specifically with reference to FIGS. 4 and 5. The substantial publication range of the article information C1 is "C, D, H, I, E, and A" (because the important flag is turned on for the article information C1). The user IDs listed in the announcement-target candidate information by the article creator "C" are "E and A". Therefore, the announcing unit 160e outputs the article information C1 to the clients of the users "E and A" common to the announcement-target candidate information and the substantial publication range.

Likewise, the substantial publication range of the article information C2 is "E, J, K, C, and D" (because the important flag is turned on for the article information C2). The user IDs listed in the announcement-target candidate information by the article creator "E" are "K, A, B, C, and D". Therefore, the announcing unit 160e outputs the article information C2 to the clients of the users "K, C, and D" common to the announcement-target candidate information and the substantial publication range.

Moreover, the substantial publication range of the article information C3 is "A to K" (because the important flag is turned off for the article information C3). The user IDs listed in the announcement-target candidate information by the article creator "J" are "K, H, I, F, and G". Therefore, the announcing unit 160e outputs the article information C3 to the clients of the users "K, H, I, F, and G" common to the announcement-target candidate information and the substantial publication range.

Furthermore, the substantial publication range of the article information C4 is "J and D" (because the important flag is turned off for the article information C4). The user IDs listed in the announcement-target candidate information by the article creator "K" are "A to J". Therefore, the announcing unit 160e outputs the article information C4 to the clients of the users "J and D" common to the announcement-target candidate information and the substantial publication range.

When the hierarchical-relation information is changed as shown in FIG. 7, then the user "H" becomes accessible to the article information C2 and the article information C2 is announced to the user "H". The user "H" is still accessible to the article information C3. However, the article information C3 is not announced to the user "H". Furthermore, the user "D" become inaccessible to the article information C2 and the article information C2 is not announced to the user "D". The user "D" is still accessible to the article information C3. However, the article information C3 is not announced to the user "D". Namely, by causing the announcing unit 160e to perform the announcement processing, the superior-subordinate information is acquired during the access to the article information. It is, therefore, possible to change users who become inaccessible to the article information and those who become accessible thereto at real time.

Figure 8:
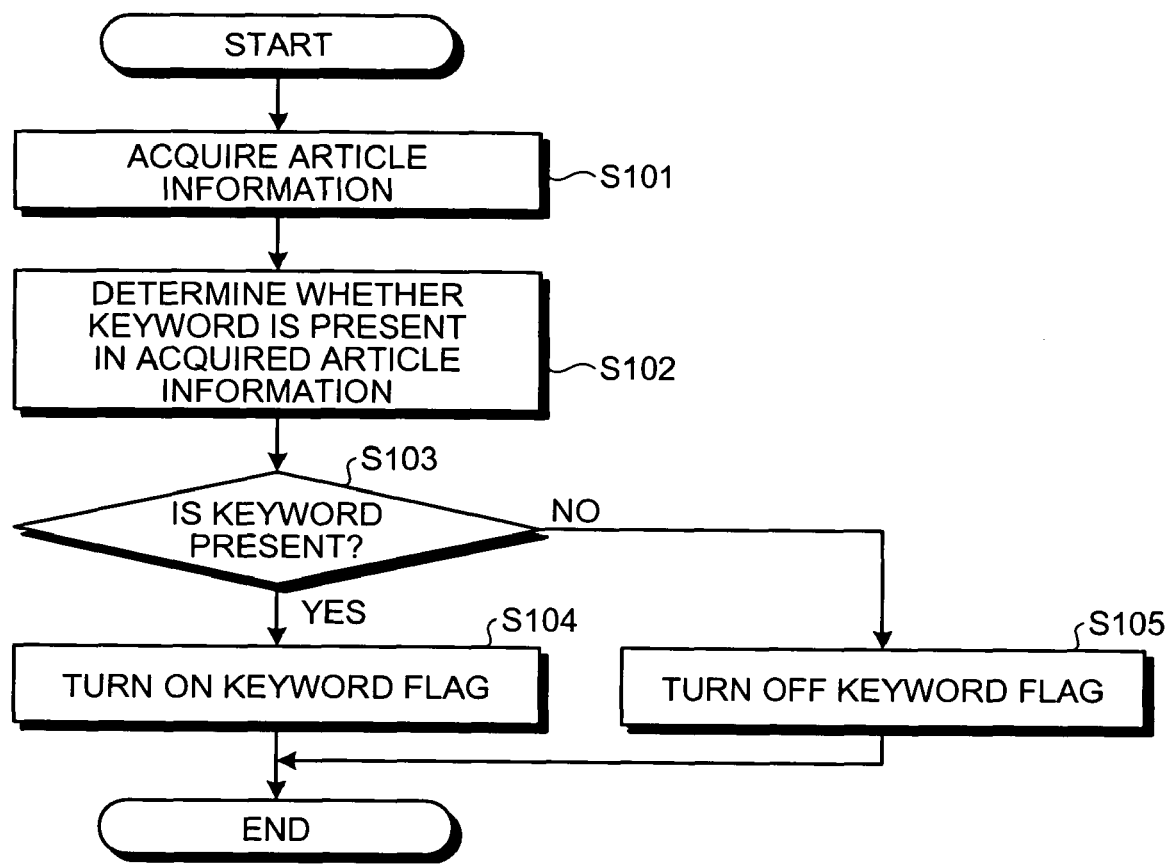
FIG. 8 is a flowchart of a processing performed by an article analyzing unit.

Processing procedures performed by the article analyzing unit 160d will be explained with reference to the flowchart of FIG. 8. As shown in FIG. 8, the article analyzing unit 160d acquires article information (step S101) and determines whether a keyword is present in the acquired article information (step S102).

If the keyword is present in the acquired article information (Yes at step S103), the article analyzing unit 160d turns on the keyword flag included in the article-management information for the acquired article information (step S104). If the keyword is not present in the acquired article information (No at step S103), the article analyzing unit 160d turns off the keyword flag (step S105).

In this manner, the article analyzing unit 160d analyzes the article information and sets the keyword flag (in other words, sets the substantial publication range of the article information) according to the content of the article information. It is, therefore, possible to easily set the appropriate publication range of the article information while solving the problems such as the information leakage.

Processing procedures performed by the announcing unit 160e will be explained with reference to flowcharts of FIGS.

Figure 9:
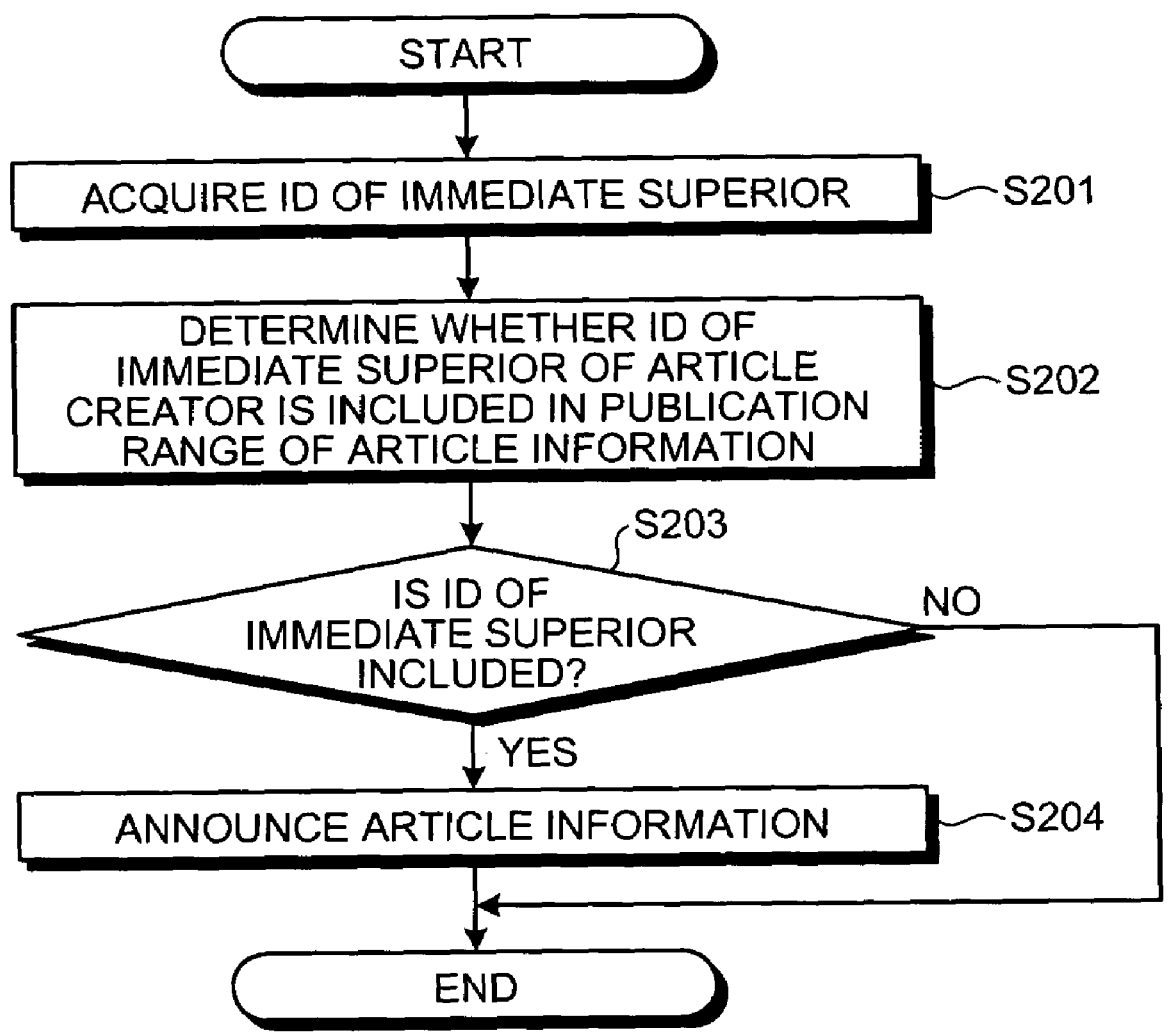
FIG. 9 is a flowchart of a bottom-up processing.
Figure 10:
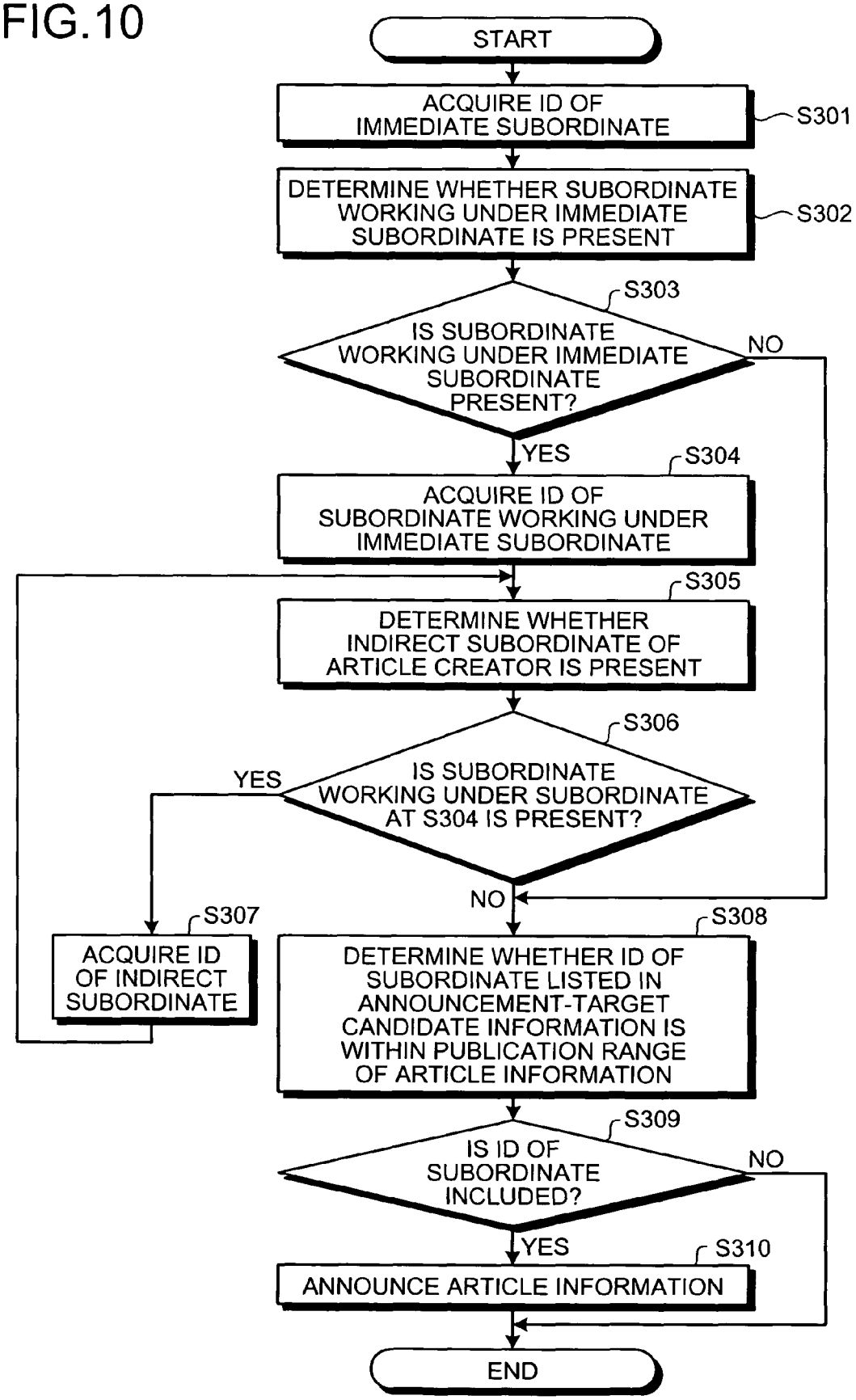
FIG. 10 is a flowchart of a top-down processing.

9 and 10. FIG. 9 is a flowchart of a bottom-up processing performed by the announcing unit 160e. FIG. 10 is a flowchart of a top-down processing performed by the announcing unit 160e. The bottom-up processing is the processing for announcing the article information to the immediate superior of the article creator. The top-down processing is the processing for announcing the article information to the subordinates including indirect subordinates of the article creator.

The bottom-up processing will first be explained. As shown in FIG. 9, the announcing unit 160e acquires the user ID of the immediate superior of the article creator by comparing the user ID of the article creator with the hierarchical-relation information (step S201). The announcing unit 160e determines whether the acquired user ID of the immediate superior of the article creator is within the publication range of the article information created by the article creator (step S202).

If the acquired user ID of the immediate superior is within the publication range of the article information (Yes at step S203), the announcing unit 160e announces the article information to the client of the immediate superior (step S204). If the acquired user ID of the immediate superior is not within the publication range of the article information (No at step S203), the announcing unit 160e finishes the bottom-up processing.

The top-down processing will next be explained. As shown in FIG. 10, the announcing unit 160e acquires the user ID of the immediate subordinate of the article creator by comparing the user ID of the article creator with the hierarchical-relation information (step S301). The announcing unit 160e determines whether a subordinate working under the immediate subordinate (hereinafter, "indirect subordinate") of the article creator is present (step S302).

If an indirect subordinate of the article creator is present (Yes at step S303), the announcing unit 160e acquires the user ID of the indirect subordinate of the article creator (step S304). The announcing unit 160e determines whether a subordinate working under the indirect subordinate identified by the user ID acquired at the step S304 is present (step S305). If a subordinate working under the indirect subordinate identified by the user ID acquired at the step S304 is present (Yes at step S306), then the announcing unit 160e acquires the user ID of the subordinate working under the indirect subordinate (step S307), and the announcing unit 160e goes to step S305.

If an indirect subordinate of the article creator is not present (No at step S303), the announcing unit 160e determines whether the user ID of the subordinate listed in the announcement-target candidate information is within the publication range of the article information created by the article creator (step S308). If the user ID of the subordinate listed in the announcement-target candidate information is within the publication range of the article information (Yes at step S309), the announcing unit 160e announces the article information to the client of the subordinate identified by the user ID listed in the announcement-target candidate information (step S310). If the user ID of the subordinate listed in the announcement-target candidate information is not within the publication range of the article information (No at step S309), the announcing unit 160e finishes the top-down processing.

In this manner, the announcing unit 160e announces the article information to the eligible users based on the user ID of the article creator, the hierarchical-relation information, and the publication range of the article information included in the article-management information. It is, therefore, possible to effectively use the article information created by the user (article creator) (e.g., for acceleration of information sharing and supervisory responsibility).

Figure 11:
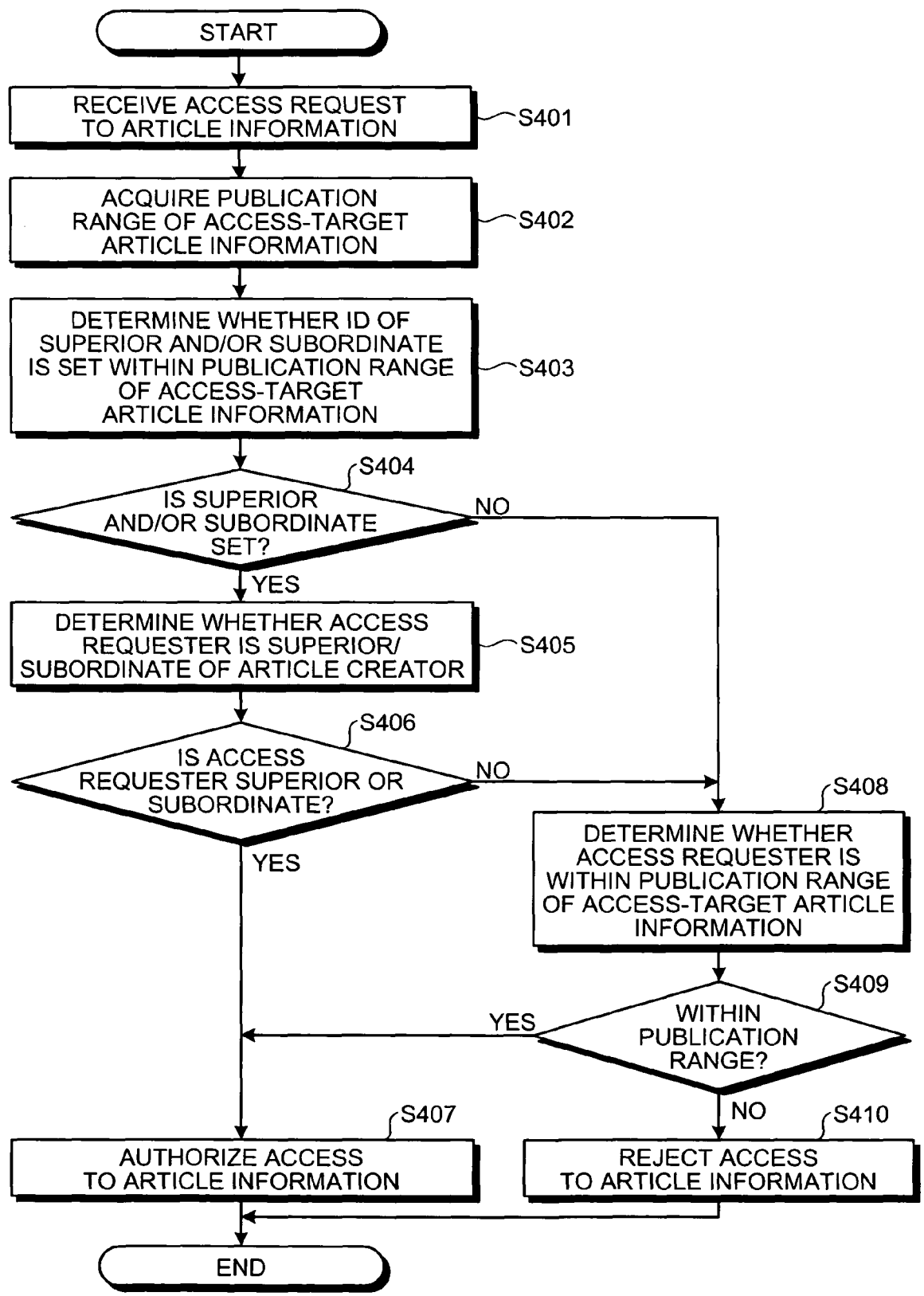
FIG. 11 is a flowchart of a processing performed by an article-information managing unit.

Processing procedures performed by the article-information managing unit 160c will be explained with reference to the flowchart of FIG. 11. The article-information managing unit 160c receives a request to access article information (hereinafter, "access request") from one of the users (hereinafter, "access requester") (step S401). The article-information managing unit 160c acquires the publication range of the access-target article information (step S402).

The article-information managing unit 160c determines whether the user ID of each of or one of the immediate superior and the immediate subordinate of the article creator who created the access-target article information is set to fall within the publication range of the access-target article information (whether the keyword flag is turned on for the access-target article information) (step S403). If each of or one of the immediate superior and the immediate subordinate is set to fall within the publication range of the access-target article information (Yes at step S404), the article-information managing unit 160c determines whether the access requester is the immediate superior/subordinate of the article creator of the access-target article information (step S405). If the access requester is the immediate superior/subordinate of the article creator (Yes at step S406), the article-information managing unit 160c authorizes the client of the access requestor to access the access-target article information (step S407). If the access requester is not the immediate superior/subordinate of the article creator (No at step S406), the article-information managing unit 160c goes to step S408.

If each of or one of the immediate superior and the immediate subordinate of the article creator is not set to fall within the publication range of the access-target article information (No at step S404), the article-information managing unit 160c determines whether the access requester is within the publication range of the access-target article information (step S408). If the access requester is within the publication range of the access-target article information (Yes at step S409), the article-information managing unit 160c goes to the step S407. If the access requester is not within the publication range (No at step S409), the article-information managing unit 160c rejects access of the client of the access requester to the access-target article information (step S410).

In this manner, the article-information managing unit 160c authorizes the client 10 of the access requester to access the access-target article information if the access requester is the immediate superior or the immediate subordinate of the article creator of the access-target article information. It is, therefore, possible to effectively use the article information and solve the problems such as the information leakage.

Figure 12:
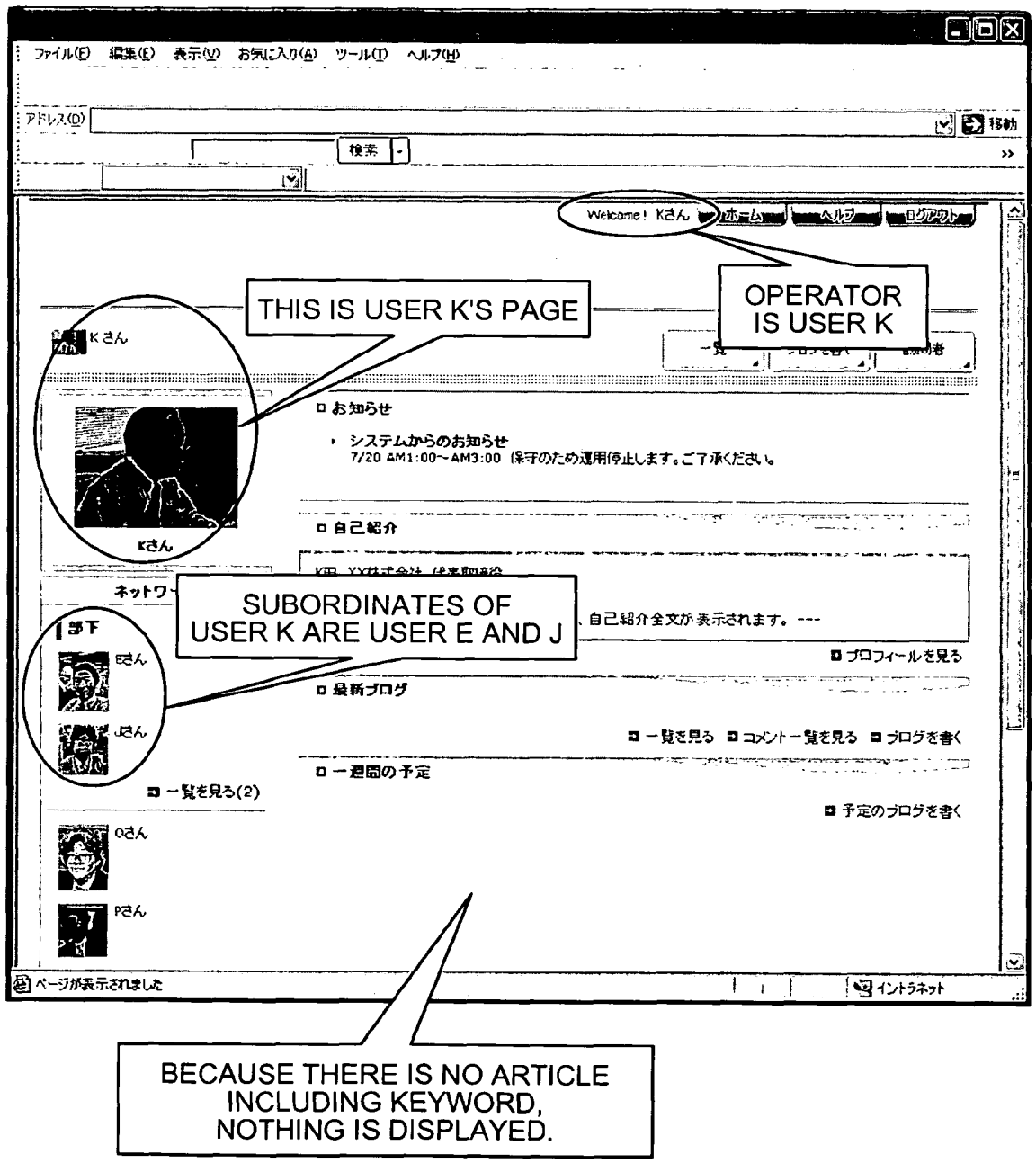

Examples of the screen of the client if the user accesses the information managing apparatus 100 using the user's client will be explained with reference to FIGS. 12 to 18. FIGS. 12 to 18 are first to seventh examples of the screen of the client, respectively. Referring to FIG. 12, if no keyword is present in the article information, the publication range of the article information does not include the users ID of the immediate superior and the immediate subordinate of the article creator of the article information. Therefore, only the users identified by the user IDs within the publication range set by the article creator can view the article.

Figure 14:
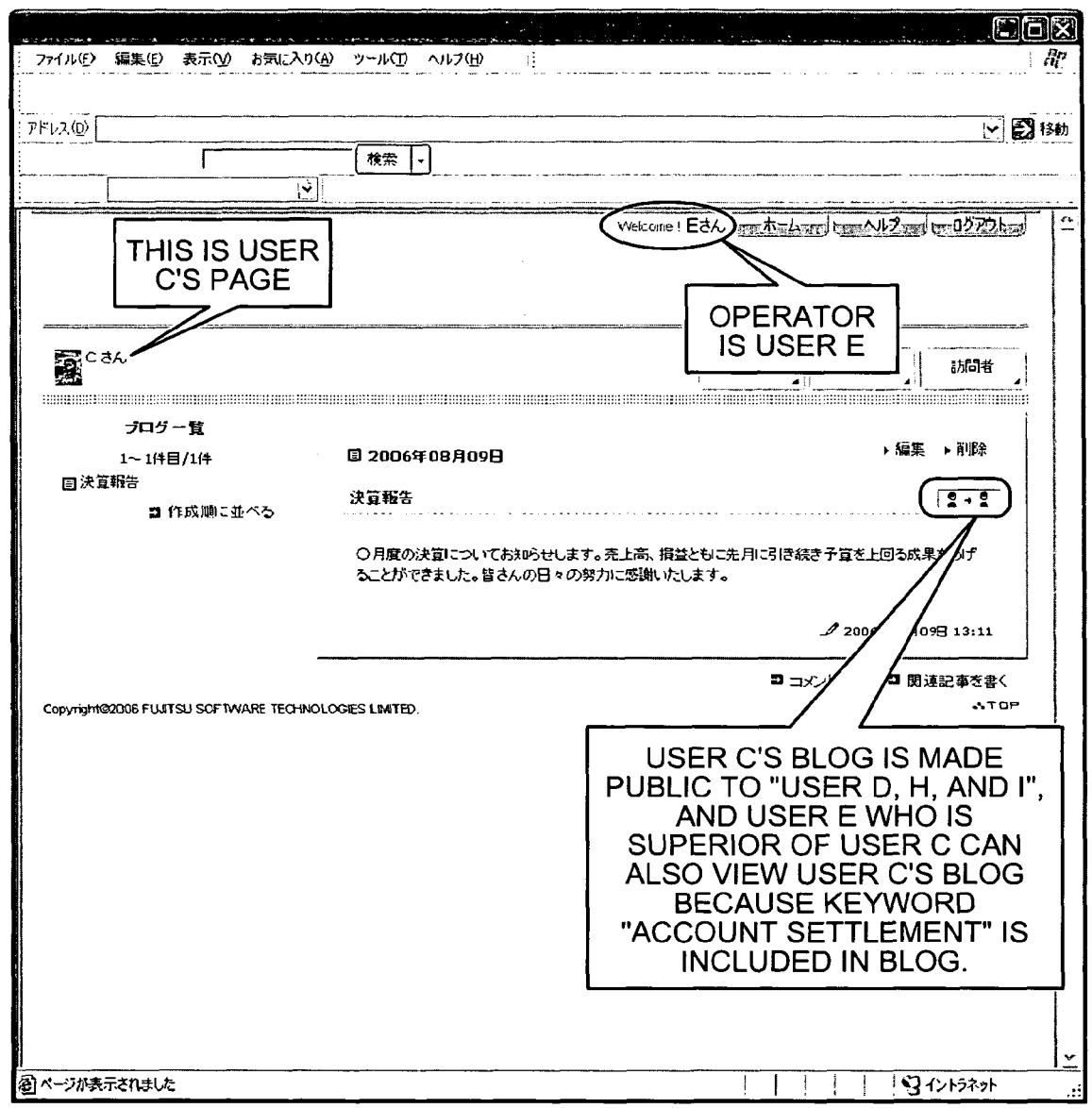

Referring to FIGS. 13 and 14, the operator of the client is the user "E". If a keyword is present in the article information created by the user "C", the user IDs of the immediate superior and the immediate subordinate of the article creator (i.e., the user "C") are within the substantial publication range of the article information. The publication range set by the user "C" is "C, D, H, and I". However, because the keyword "account settlement" is present in the article information created by the user "C", the superior (i.e., the user "E") of the user "C" can view the article information.

Figure 15:
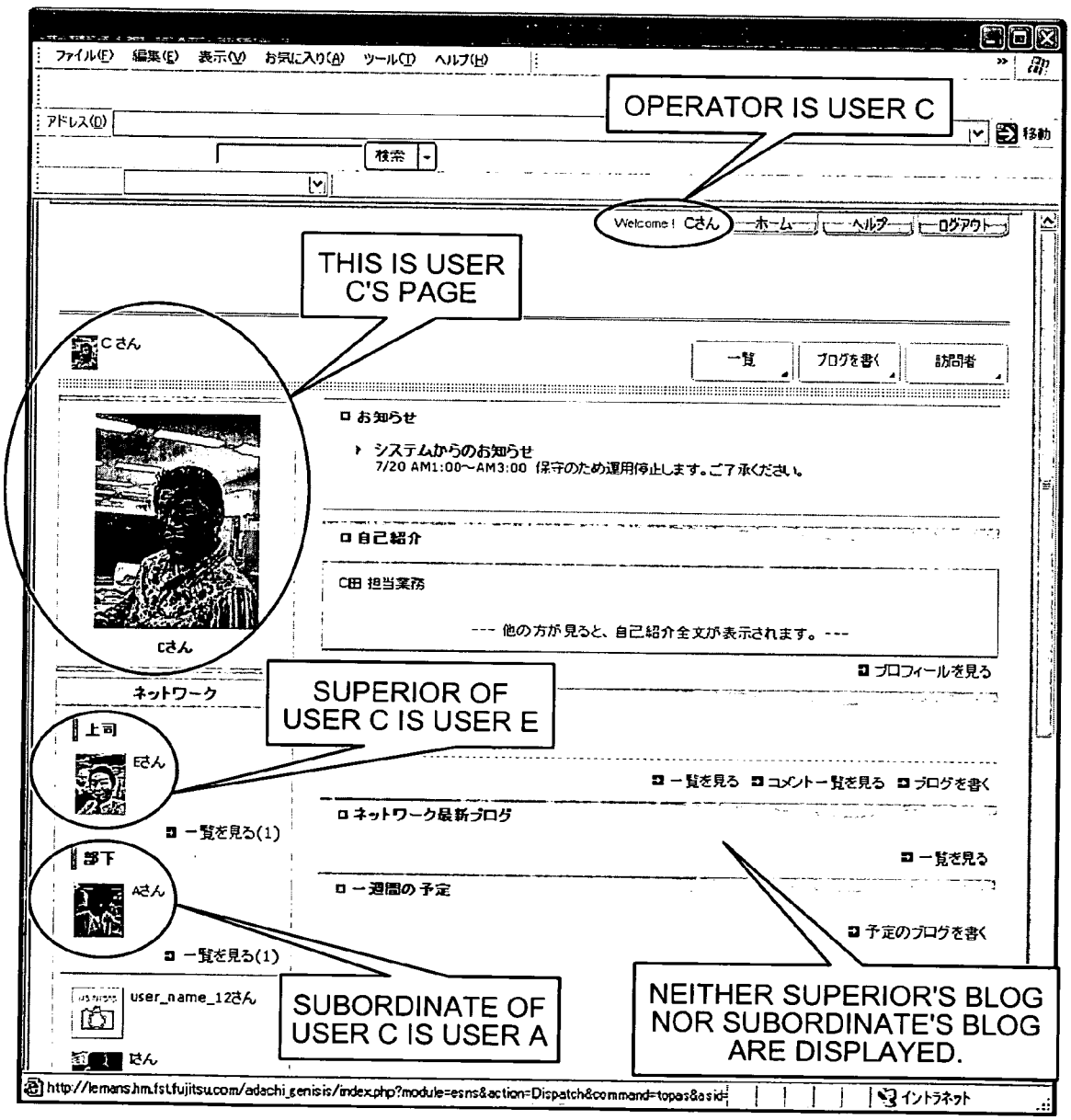
Figure 16:
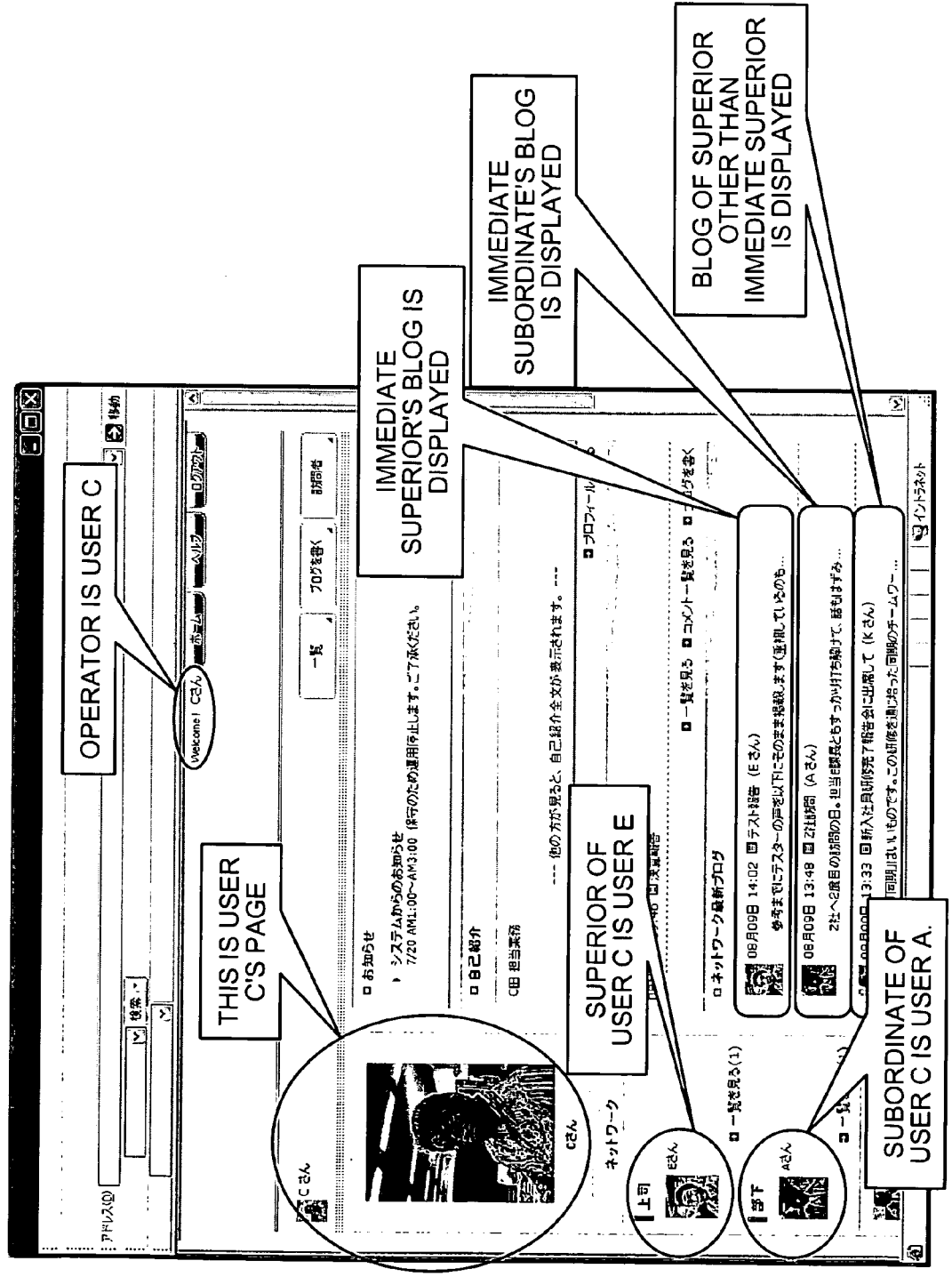

The fourth example of the screen of the client shown in FIG. 15 relates to the conventional technique. As shown in FIG. 15, no announcement is made and no article information is displayed on the screen of the client of the user. According to the present embodiment of the present invention, by contrast, the announcing unit 160e announces the article information to the immediate superior and the subordinate of the article creator as shown in FIG. 16.

Figure 17:
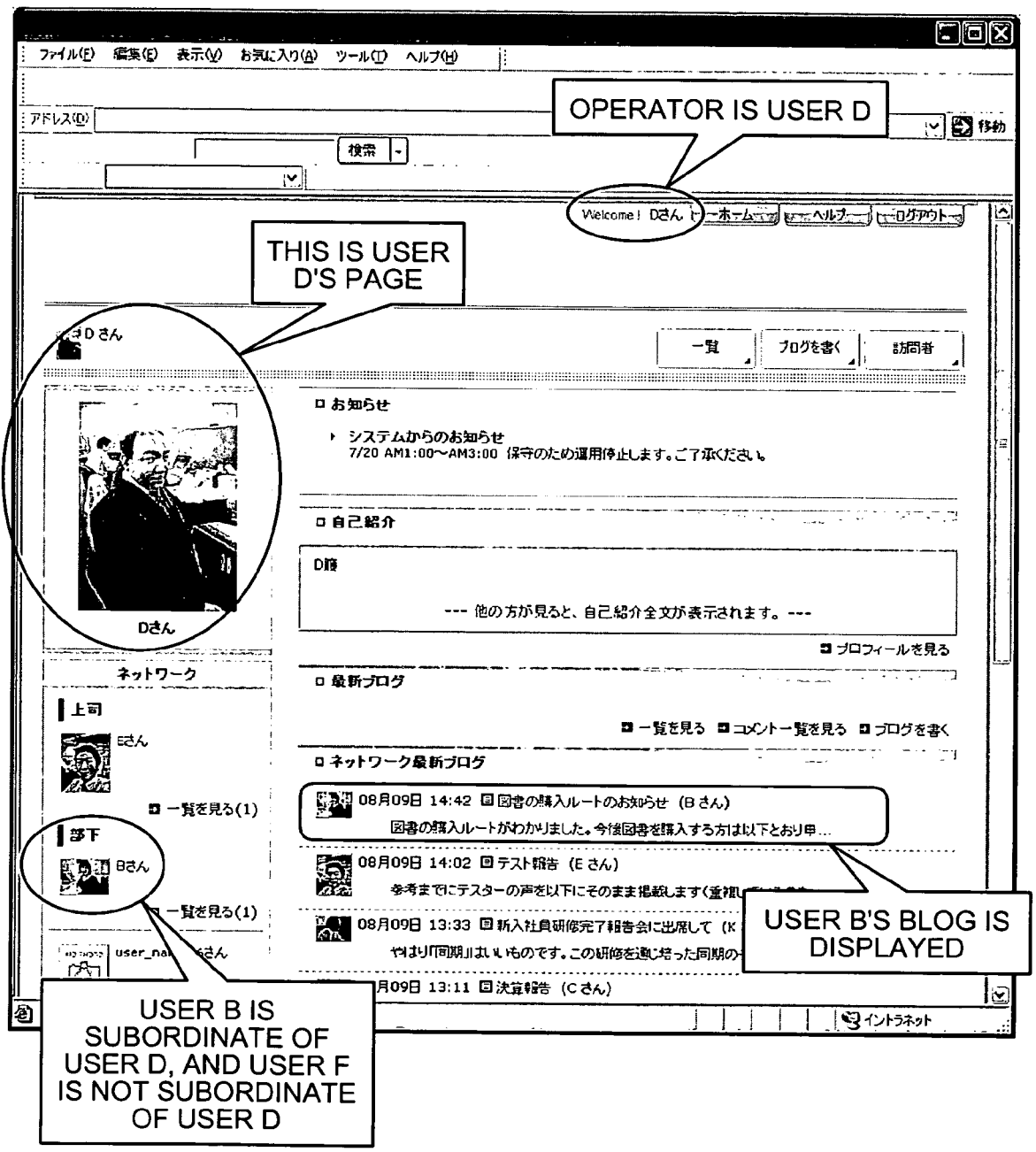
Figure 18:
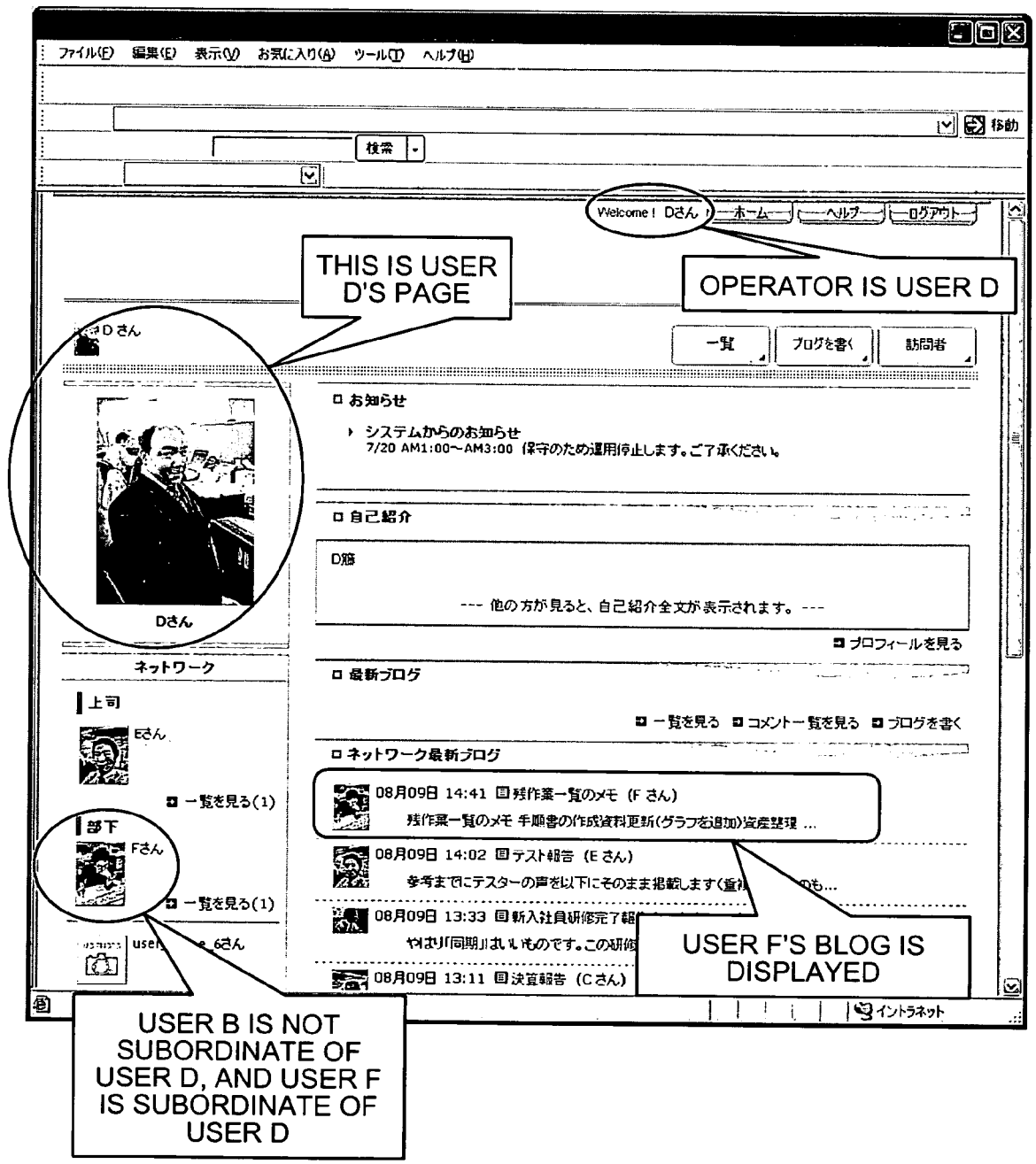

Referring to FIGS. 17 and 18, if the hierarchical-relation information is changed, the article information displayed on the screen of the client is changed, accordingly. Namely, as shown in FIG. 17, before the change of the hierarchical-relation information, the blog of the user "B" is displayed on the screen of the client operated by the user "D". In the sixth example of FIG. 17, the user "B" is the immediate subordinate of the user "D". As shown in FIG. 18, after the change of the hierarchical-relation information (i.e., after the immediate subordinate of the user "D" is changed from the user "B" to the user "F"), the blog of the user "F" is displayed on the screen of the client operated by the user "D".

As explained above, the information managing apparatus 100 stores the hierarchical-relation information 150b included in the storing unit 150. If acquiring the article information created by one of the users ("article creator"), the information managing apparatus 100 records the acquired article information as the article-management information 150c included in the storing unit 150. The announcing unit 160e determines to the clients of which users the article information is to be output based on the hierarchical-relation information and the article-management information. Furthermore, the announcing unit 160e outputs ("announces") the article information to the clients of the eligible users based on the determination result. It is, therefore, possible to appropriately set the publication range of the article information and make effective use of the article information.

Furthermore, if the information managing apparatus 100 acquires the article information, the article analyzing unit 160d determines whether a keyword is present in the acquired article information. If a keyword is present in the acquired article information, the article analyzing unit 160d enlarges the publication range of the article information to include the immediate superior and the immediate subordinate of the article creator. It is, therefore, possible to prevent leakage of the article information to the malicious third party, and make effective use of the article information.

According to the present embodiment, the superior-subordinate relation information in the company has been explained as an example of the hierarchical-relation information on the users having the superior-subordinate relation. However, the hierarchical-relation information is not limited to the superior-subordinate relation information. For example, information on priorities (or hierarchies) ("priority (hierarchical) information") of the users or various other information can be recorded as the hierarchical-relation information. In this case, the announcing unit 160e can determine where to output (announce) the article information based on the priority (hierarchical) information or the various other information.

The processings explained in the present embodiment can be realized by causing a computer to execute a program prepared in advance. An example of the computer that executes the program for realizing the processings will be explained with reference to FIG. 19.

Figure 19:
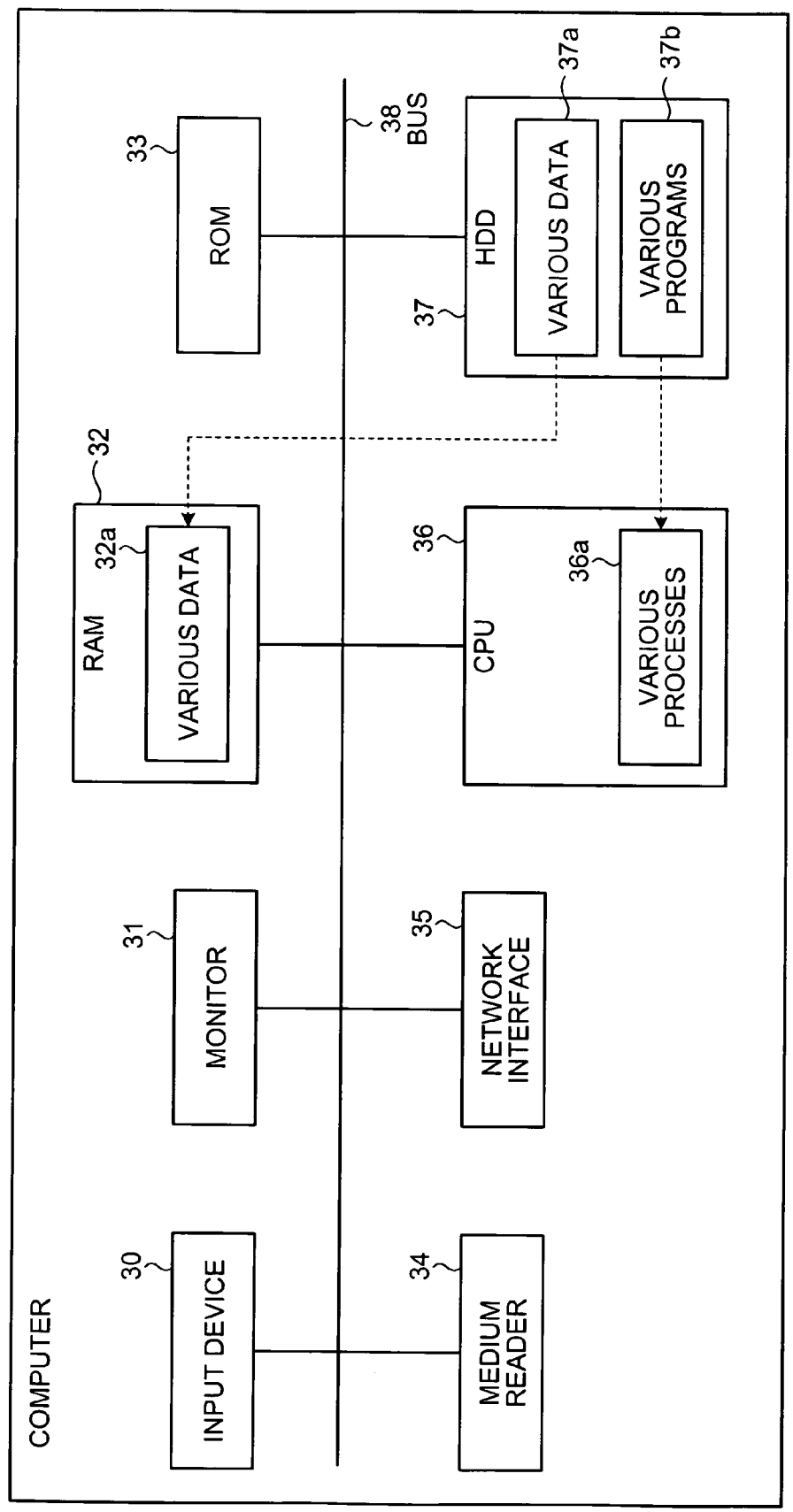
FIG. 19 is a block diagram of a computer that constitutes the information managing apparatus shown in FIG. 1.

FIG. 19 is a hardware block diagram of a computer that constitutes the information managing apparatus 100 shown in FIG. 1. The computer is configured to connect an input device 30, a monitor 31, a random access memory (RAM) 32, a read only memory (ROM) 33, a medium reader 34, a network interface 35, a central processing unit (CPU) 36, and a hard disk drive (HDD) 37 to one another by a bus 38. The input device 30 receives data from each user. The medium reader 34 reads a program from a recording medium that stores therein various programs. The network interface 35 interfaces the computer with the other computer for transmission and reception of data via a network.

The HDD 37 stores therein various programs 37b that function similarly to the functions of the information managing apparatus 100. The CPU 36 reads the various programs 37b from the HDD 37 and executes the various programs 37b, whereby various processes 36a for realizing the functions of the information managing apparatus 100 are activated.

The CPU 36 stores various data 37a corresponding to the data stored in the storing unit 150 of the information managing apparatus 100 in the HDD 37. Furthermore, the CPU 36 reads the various data 37a from the HDD 37 and stores, as various data 32a, the various data 37a in the RAM 32. The CPU 36 performs a data processing based on the various data 32a stored in the RAM 32.

The various programs 37b are not necessarily stored in the HDD 37 by default. For example, the various programs 37b can be stored in "a portable physical medium" inserted into the computer, "a fixed physical medium" provided inside or outside of the computer, "the other computer (or server)" or the like. In this case, the computer can read the various programs 37b from "the portable physical medium", "the fixed physical medium", "the other computer (or server)" or the like, and can execute the various programs 37b. Examples of "the portable physical medium" include a flexible disk (FD), a CD-ROM, a DVD disk, a magnetooptical disk, and an IC card. Examples of "the fixed physical medium" include a hard disk drive (HDD). "The other computer (or server)" is connected to the computer via a public line, the Internet, a local area network (LAN), and a wide area network (WAN).

The present embodiments of the present invention have been explained so far. However, various other embodiments can be used to carry out the present invention within the scope of the technical concept of the invention defined in claims.

Moreover, all of or a part of the processings explained as being automatically performed can be performed manually. All of or a part of the processings explained as being manually performed can be performed automatically by a well-known method.

Furthermore, the processing procedures, control procedures, specific names, and information including various data and parameters explained and shown in the specification and drawings can be changed as desired unless specified otherwise.

Moreover, the constituent elements of the information managing apparatus 100 are functionally conceptual and are not necessarily configured physically as shown in the drawings. Namely, specific forms of distribution and integration of the respective constituent elements or devices are not limited to those shown in the drawings. All of or a part of the constituent elements or devices can be distributed or integrated either functionally or physically in desired units according to various loads, utilization situations, and the like.

Furthermore, all of or a part of the processing functions performed by the respective constituent elements or devices can be realized by the CPU and the programs analyzed and executed by the CPU or realized as wired logic hardware.

As describe above, according to an embodiment of the present invention, the article information can be announced to eligible users and can be effectively used.

Furthermore, according to an embodiment of the present invention, if the article information is acquired from the user based on the hierarchical-relation information including information on the user having the superior-subordinate relation, the article information is output (i.e., "announced") to both of or one of the superior and the subordinate of the user who created the article information. It is, therefore, possible to efficiently announce the article information to the superior who takes the supervisory responsibility for the article information or the supervisory-target subordinate.

Moreover, according to an embodiment of the present invention, the article information can be made effective use of while solving the problems such as the information leakage.

Furthermore, according to an embodiment of the present invention, the article information can be made effective use of while effectively controlling the publication range of the article information.

Moreover, according to an embodiment of the present invention, even if the hierarchical-relation information is changed, then destinations of the article information can be flexibly changed, and the problems such as the information leakage can be thereby solved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program for managing information on an article shared among a plurality of users on a network, wherein
the computer program causes a computer to at least execute:
storing hierarchical-relation information indicating a hierarchical relation between the plurality of users by using identification information of the users;
authenticating a creating user creating the article by using the identification information of the creating user;
receiving the article from the creating user authenticated with a first publication range designating at least one of the plurality of users to which the creating user as authenticated intends to publish the article;
adding a related user to the at least one of the plurality of users designated by the first publication range received to obtain a second publication range, the related user being superior or subordinate to the creating user and determined based on the identification information of the creating user in the hierarchical-relation information;
wherein the adding includes controlling an accessible user who is accessible to the received article based on a result of a determination to obtain the second publication range;
determining whether a predetermined keyword is included in the received article;
determining that an output destination of the received article is a user included in the second publication range obtained; and
outputting the received article to the output destination determined.

2. The computer-readable recording medium according to claim 1, wherein
the hierarchical relation is a superior-subordinate relation, and
the determining includes determining to output the received article to at least one of an immediate superior of the creating user and an immediate subordinate of the creating user based on the hierarchical relation.

3. The computer-readable recording medium according to claim 1, wherein
once the predetermined keyword is included in the information on the received article, the controlling includes authorizing a superior and a subordinate of the creating user to access the received article.

4. The computer-readable recording medium according to claim 1, wherein
the computer program further causes the computer to execute updating the hierarchical-relation information once the hierarchical-relation information is changed, and
the determining includes determining the output destination based on the updated hierarchical-relation information.

5. An apparatus for managing information on an article shared among a plurality of users on a network, the apparatus comprising:
a memory that stores therein hierarchical-relation information indicating a hierarchical relation between the plurality of users;
an authenticating unit that authenticates a creating user creating the article by using identification information of the creating user;
a receiving unit that receives the article from the creating user authenticated with a first publication range designating at least one of the plurality of users to which the creating user as authenticated intends to publish the article;
a managing unit that adds a related user to the at least one of the plurality of users designated by the first publication range received to obtain a second publication range, the related user being superior or subordinate to the creating user and determined based on the identification information of the creating user in the hierarchical-relation information;
wherein the managing unit determines whether a predetermined keyword is included in the received article, and controls a user who is accessible to the received article based on a result of determination to obtain the second publication range;
a determining unit that determines that an output destination of the received article is a user included in the second publication range; and
an output unit that outputs the received article to the output destination determined.

6. The apparatus according to claim 5, wherein
the hierarchical relation is a superior-subordinate relation, and
the determining unit determines to output the received article to at least one of an immediate superior of the creating user and an immediate subordinate of the creating user based on the hierarchical relation.

7. The apparatus according to claim 5, wherein
once the predetermined keyword is included in the information on the received article, the managing unit authorizes a superior and a subordinate of the creating user to access the received article.

8. A method of managing information on an article shared among a plurality of users on a network, the method comprising:

storing hierarchical-relation information indicating a hierarchical relation between the plurality of users;

authenticating a creating user creating the article by using identification information of the creating user;

receiving the article from the creating user authenticated with a first publication range designating at least one of the plurality of users to which the creating user as authenticated intends to publish the article;

adding a related user to the at least one of the plurality of users designated by the first publication range received to obtain a second publication range, the related user being superior or subordinate to the creating user and determined based on the identification information of the creating user in the hierarchical-relation information;

wherein the adding includes controlling an accessible user who is accessible to the received article based on a result of a determination to obtain the second publication range;

determining whether a predetermined keyword is included in the received article;

determining that an output destination of the received article is a user included in the second publication range obtained; and outputting the received article to the output destination determined.

\* \* \* \* \*